(12) United States Patent
Yamamoto

(10) Patent No.: US 6,535,245 B1
(45) Date of Patent: Mar. 18, 2003

(54) COLOR BALANCE ADJUSTING DEVICE

(75) Inventor: Yasuhiro Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/097,704

(22) Filed: Jun. 16, 1998

(30) Foreign Application Priority Data

Jun. 17, 1997 (JP) .......................................... P09-176475

(51) Int. Cl.$^7$ ............................ H04N 9/73; H04N 9/64; H04N 5/57; H04N 5/222; G06K 9/00
(52) U.S. Cl. .................. 348/223.1; 348/256; 348/603; 348/645; 348/333.04; 382/162
(58) Field of Search ................................. 348/255, 256, 348/603, 645, 231, 232, 233, 333.02, 333.05, 333.04, 576, 577, 612, 231.3, 231.6, 223.1; 382/162; 358/520

(56) References Cited

U.S. PATENT DOCUMENTS

| | | | | |
|---|---|---|---|---|
| 4,811,086 A | * | 3/1989 | Hieda ........................... | 348/227 |
| 4,814,861 A | * | 3/1989 | Hieda ........................... | 348/256 |
| 4,951,134 A | * | 8/1990 | Nakasima et al. ........... | 348/223 |
| 5,041,911 A | * | 8/1991 | Moorman ..................... | 348/364 |
| 5,132,825 A | * | 7/1992 | Miyadera ..................... | 348/227 |
| 5,452,017 A | * | 9/1995 | Hickman ...................... | 348/646 |
| 5,488,492 A | * | 1/1996 | Abe .............................. | 358/518 |
| 5,627,587 A | * | 5/1997 | Murata et al. ............... | 348/231 |
| 5,659,358 A | * | 8/1997 | Hieda ........................... | 348/255 |
| 5,857,121 A | * | 1/1999 | Arai et al. .............. | 348/333.02 |
| 6,057,931 A | * | 5/2000 | McConnell et al. ......... | 358/520 |
| 6,111,607 A | * | 8/2000 | Kameyama .................. | 348/255 |
| 6,275,231 B1 | * | 8/2001 | Obradovich ................. | 345/970 |

FOREIGN PATENT DOCUMENTS

| | | | | |
|---|---|---|---|---|
| JP | 05260351 A | * | 10/1993 | .......... H04N/5/225 |
| JP | 08329217 A | * | 12/1996 | .............. G06T/1/00 |

* cited by examiner

*Primary Examiner*—Wendy R. Garber
*Assistant Examiner*—John M Villecco
(74) *Attorney, Agent, or Firm*—Greenblum & Bernstein, P.L.C.

(57) ABSTRACT

The color balance adjusting device comprises buttons, indicated on a surface of a display device, which can be moved rightward and leftward on the surface, by dragging a mouse. In accordance with the displacement of the buttons, gains of a red component signal, a green component signal and a blue component signal are changed. When a value of pixel data of one of the color components exceeds a saturation range, due to the gain adjustment, the color of a part of the color image indicated on a surface of a display device, in which the saturation occurs, is altered. Further, a comment, implying the occurrence of saturation, is generated by the display device.

19 Claims, 8 Drawing Sheets

FIG. 5
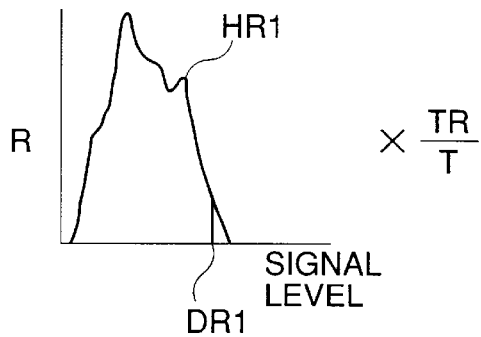
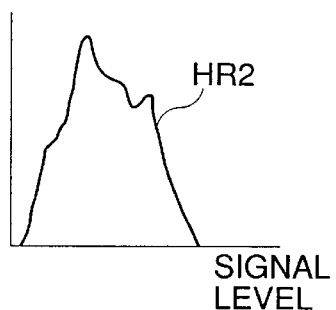
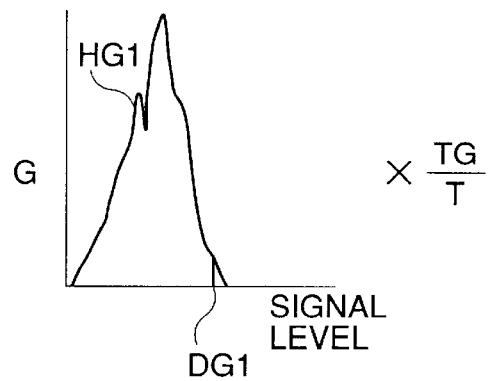
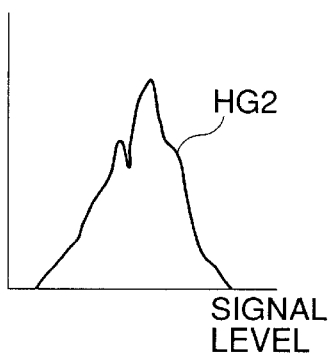
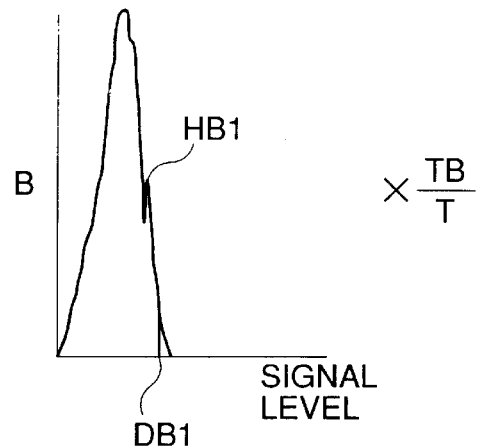
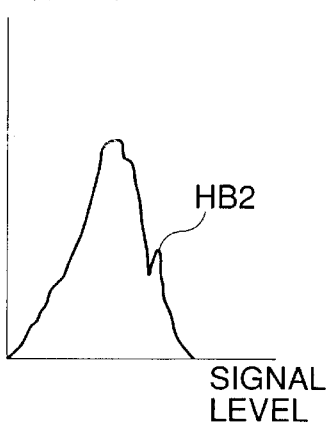

COLOR BALANCE ADJUSTING DEVICE

BACKGROUND OF THE INVENTION

1. Field of the Invention

The present invention relates to a color balance adjusting device provided in an image reading device in which an image, recorded in a film, for example, is irradiated with a light beam and the image is read using a line sensor.

2. Description of the Related Art

Conventionally, there is known an image reading device in which a film is intermittently moved in a direction perpendicular to a longitudinal direction of a line sensor, so that a color image is read line by line. Namely, while the film is stopped, a light beam outputted from a light source illuminates the film, so that one line image is sensed by the line sensor. After this sensing operation, the film is moved by a predetermined amount by a moving mechanism. The sensing operation and the movement are repeatedly carried out, so that one frame image is read.

In such a reading operation by the line sensor, first, the image is pre-scanned with a coarse pitch, and then, the color image obtained by the pre-scanning operation is indicated on a surface of a display device. The user can adjust, while viewing the color image on the display, gains relating to red, green and blue components, so that the color balance of the color image is changed in accordance with the preference of the user. Namely, in accordance with the adjusted gains, a scanning operation is again performed, and a color image which is subjected to the color balance is indicated on the display device.

In this color balance adjustment, if a value of the pixel data reaches a limit value of a saturation range, a tint of the reproduced image indicated on the display device is unacceptably exaggerated with respect to the original image. Although the saturation can be recognized once scanning of the film, after the color balance adjustment is made, and reproduction of the image on the display device is controlled, it takes a long time, due to the operations, until it can be determined whether saturation has occurred. Further, depending upon the quantity of saturation, the saturation may not be determined by only viewing the whole image.

SUMMARY OF THE INVENTION

Therefore, an object of the present invention is to provide a color balance adjusting device, in which, when gain adjustments to color components of an image are made, it can be immediately or easily determined whether image data has become saturated due to the adjusted gains.

According to the present invention, there is provided a color balance adjusting device, by which a color balance of a color image, which includes pixel data composed of at least a first color component and a second color component, is adjusted. The device comprises a gain changing processor, a pixel data calculating processor and a warning processor.

The gain changing processor changes a gain of each of the first and second color components. The pixel data calculating processor calculates pixel data of the first and second color components, using the gains changed by the gain changing processor. The warning processor outputs a warning implying that the gain, which is changed by the gain changing processor, is improper, when at least a part of the pixel data of the first and second color components, which is obtained by the pixel data calculating processor, deviates from a saturation range.

Further, according to the present invention, there is provided a color balance adjusting device, by which a color balance of a color image, which includes pixel data composed of a plurality of color components, is adjusted. The device comprises a gain changing processor and a warning processor.

The gain changing processor changes gains of the color components. The warning processor outputs a warning implying that a part of the pixel data deviates from a saturation range, when pixel data, which deviates from the saturation range, exists in pixel data of the plurality of color components calculated by using the gains changed by the gain changing processor.

BRIEF DESCRIPTION OF THE DRAWINGS

The present invention will be better understood from the description of the preferred embodiments of the invention set forth below, together with the accompanying drawings, in which:

FIG. 5 shows histograms generated based on image data obtained in a coarse scanning operation executed in Step 102 of FIG. 3;

DESCRIPTION OF THE PREFERRED EMBODIMENTS

Figure 1:
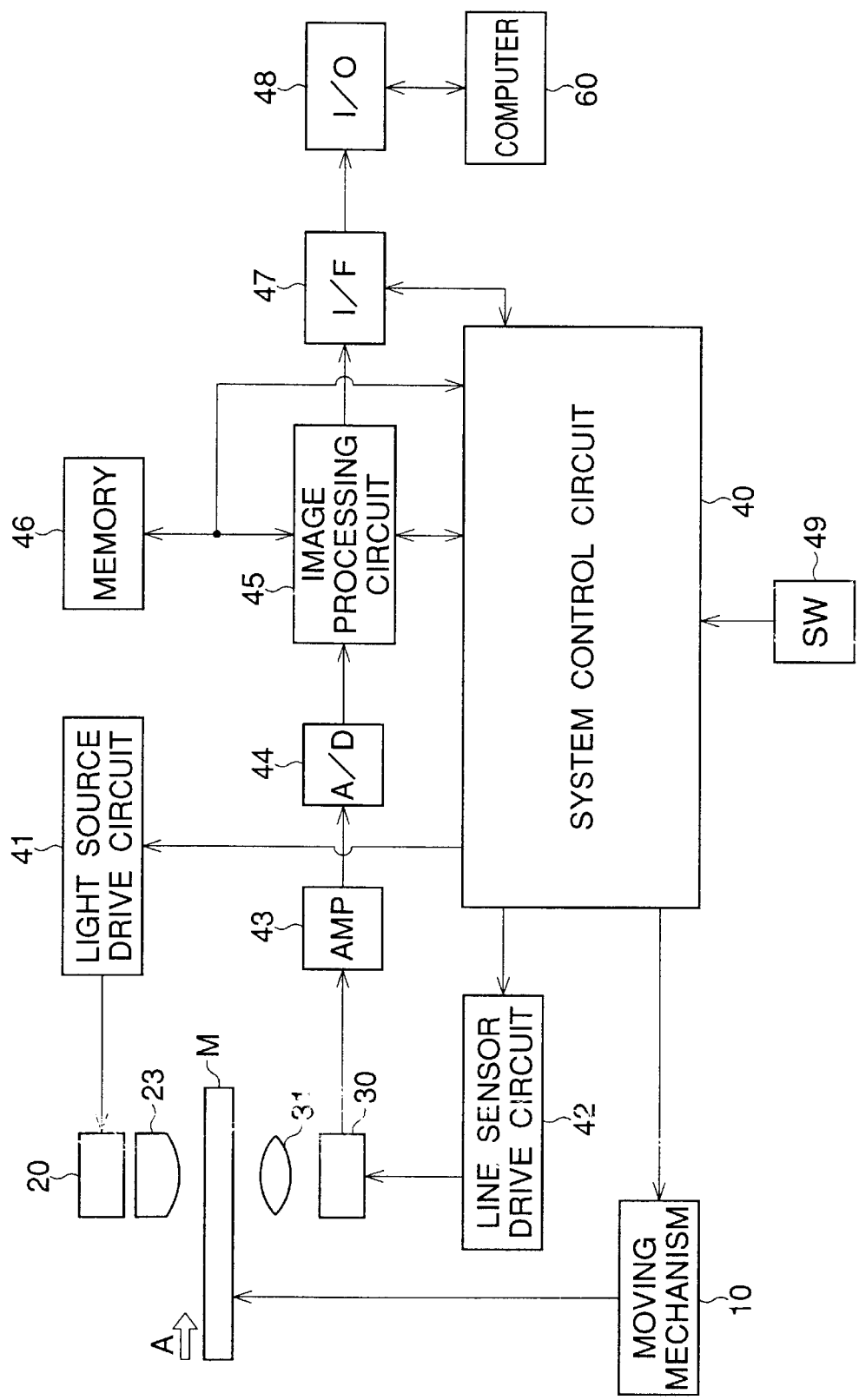
FIG. 1 is a block diagram showing an image reading device, in which a color balance adjusting device of an embodiment of the present invention is mounted.

The present invention will be described below with reference to the embodiment shown in the drawings.

FIG. 1 shows an electrical structure of an image reading device, in which a color balance adjusting device of an embodiment of the present invention is mounted.

A read object M, handled by this image reading device, is a transparent negative film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photodiodes, which are aligned rectilinearly, whereby an electric signal, corresponding to the amount of light received by the photo-diode, is generated in each of the photo-diodes. The electric signal (i.e. the image data), read through the line sensor 30, is amplified by an amplifier 43 and is converted to a digital signal by an A/D converter 44. The digital pixel data is subjected to an image process, such as a shading correction, in an image processing circuit 45, and is then stored in a memory 46.

The image data, subsequent to being read from the memory 46, is subjected to a correction process, such as a color correction and a gamma correction. Then, the image data is converted to a signal, which conforms to a predetermined format, by an interface circuit 47, and is outputted to an external computer (i.e. an image processing device) 60 through an input/output terminal 48. Thus, the image reading device and the external computer 60 can communicate with each other through the interface circuit 47 and the input/output terminal 48, so that various control operations can be performed in the image reading device and the external computer 60. The image processing circuit 45 and the interface circuit 47 are controlled by the system control circuit 40.

In this embodiment, although each of the operations can be controlled by the external computer 60, a switch 49 may be connected to the system control circuit 40, so that various operations can be directly performed, such as reading the image recorded on the film M, for example.

Figure 2:
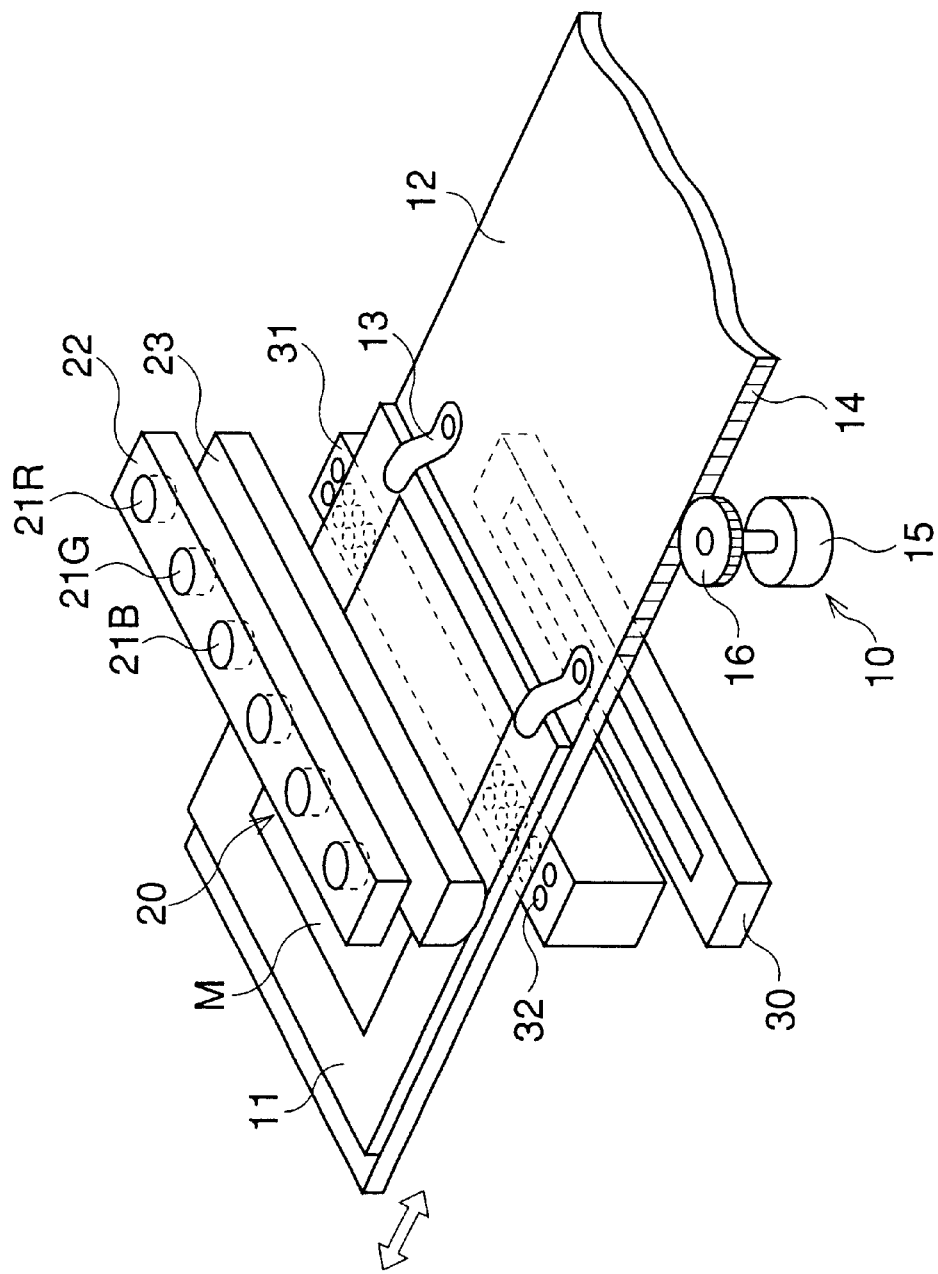
FIG. 2 is a perspective view showing a moving mechanism, a light source and a line sensor.

FIG. 2 shows the moving mechanism 10, the light source 20 and the line sensor 30. The film M is supported by a frame 11, which is fixed on a plate stage 12 by a fastener 13. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position and the moving speed of the film M are controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the film M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the film M is moved. The forming lens 31 is provided between the line sensor 30 and the stage 12. The forming lens 31, composed of a rod lens array 32, extends parallel to the line sensor 30. Accordingly, when a light beam is emitted onto the film M, by the light source 20, the image recorded in the film M is formed on the light receiving surface of the line sensor 30, through the forming lens 31.

Figure 3:
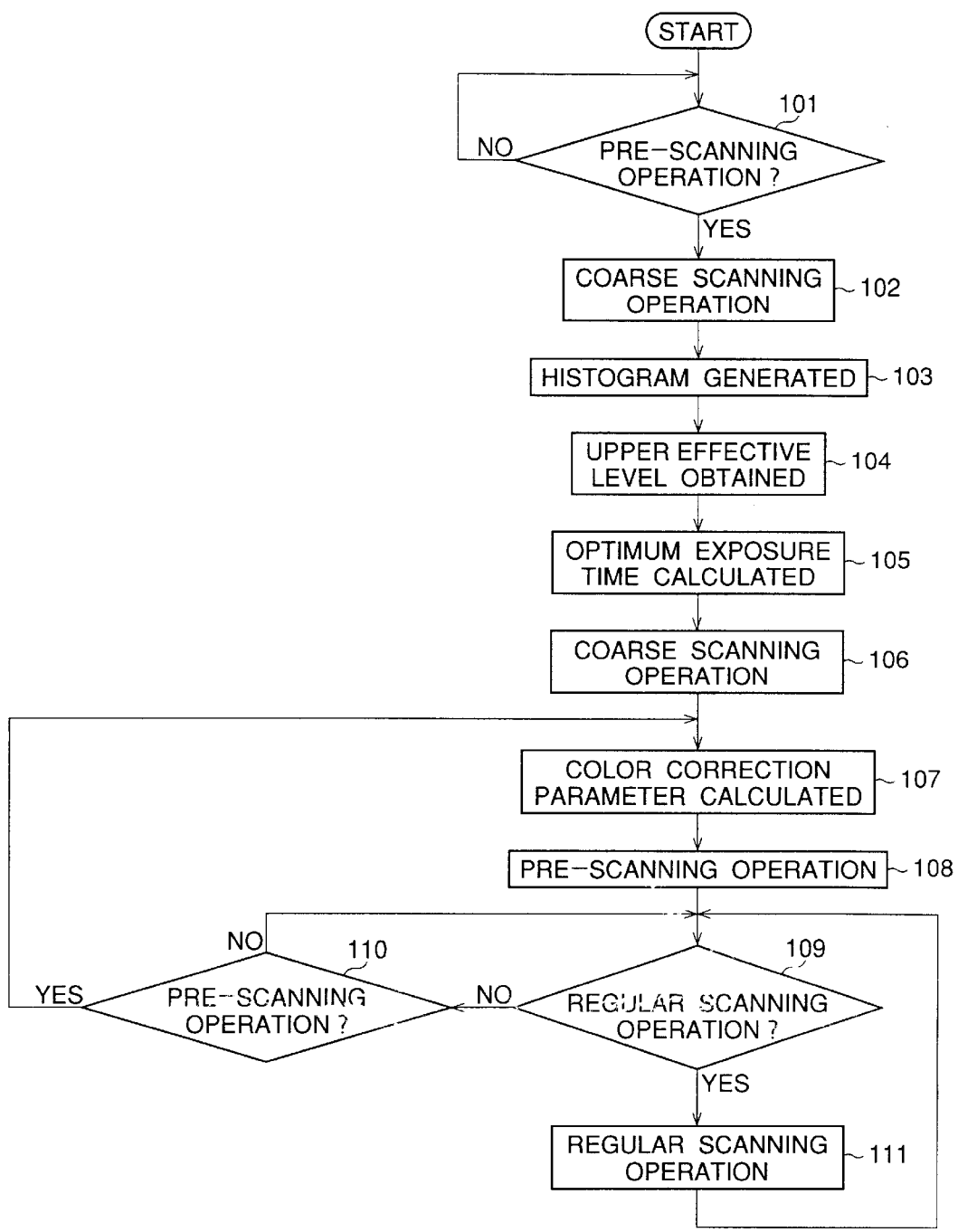
FIG. 3 is a flowchart of an image reading routine executed in the image reading device.
Figure 4:
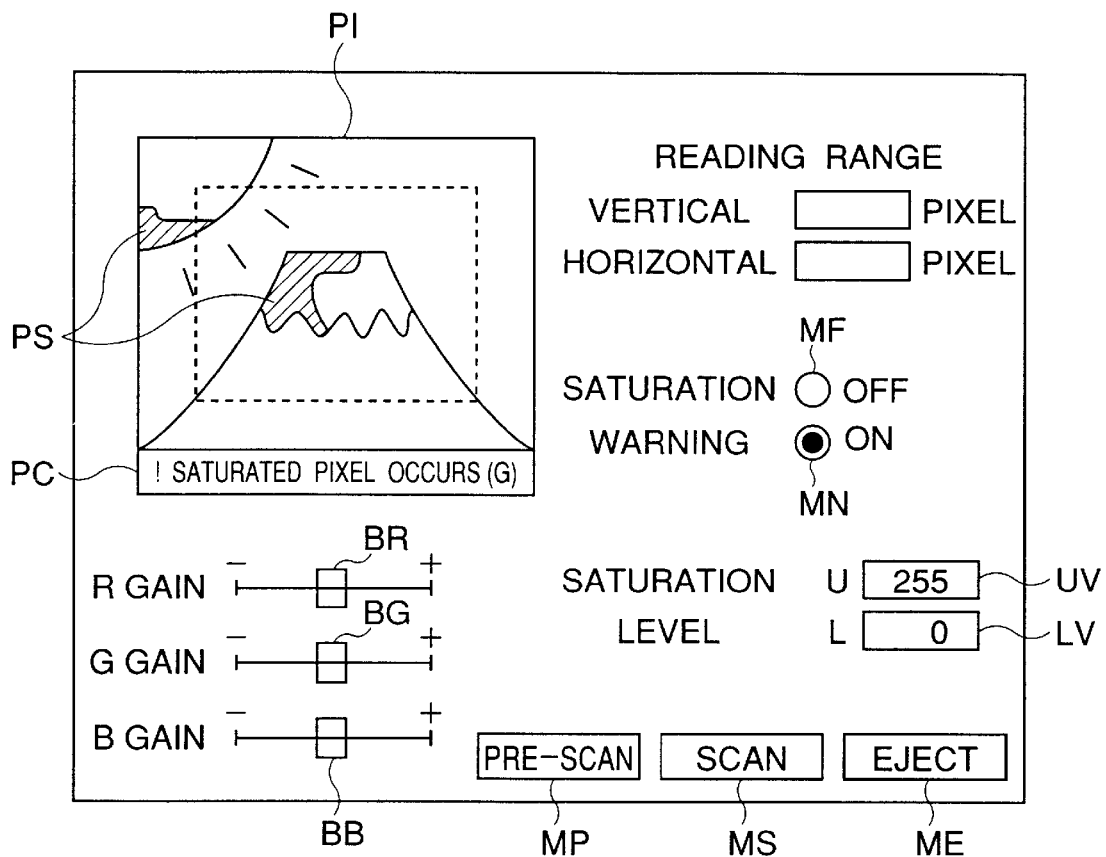
FIG. 4 is a view showing an example of a surface of a display device of a computer utilized in the embodiment.
Figure 6:
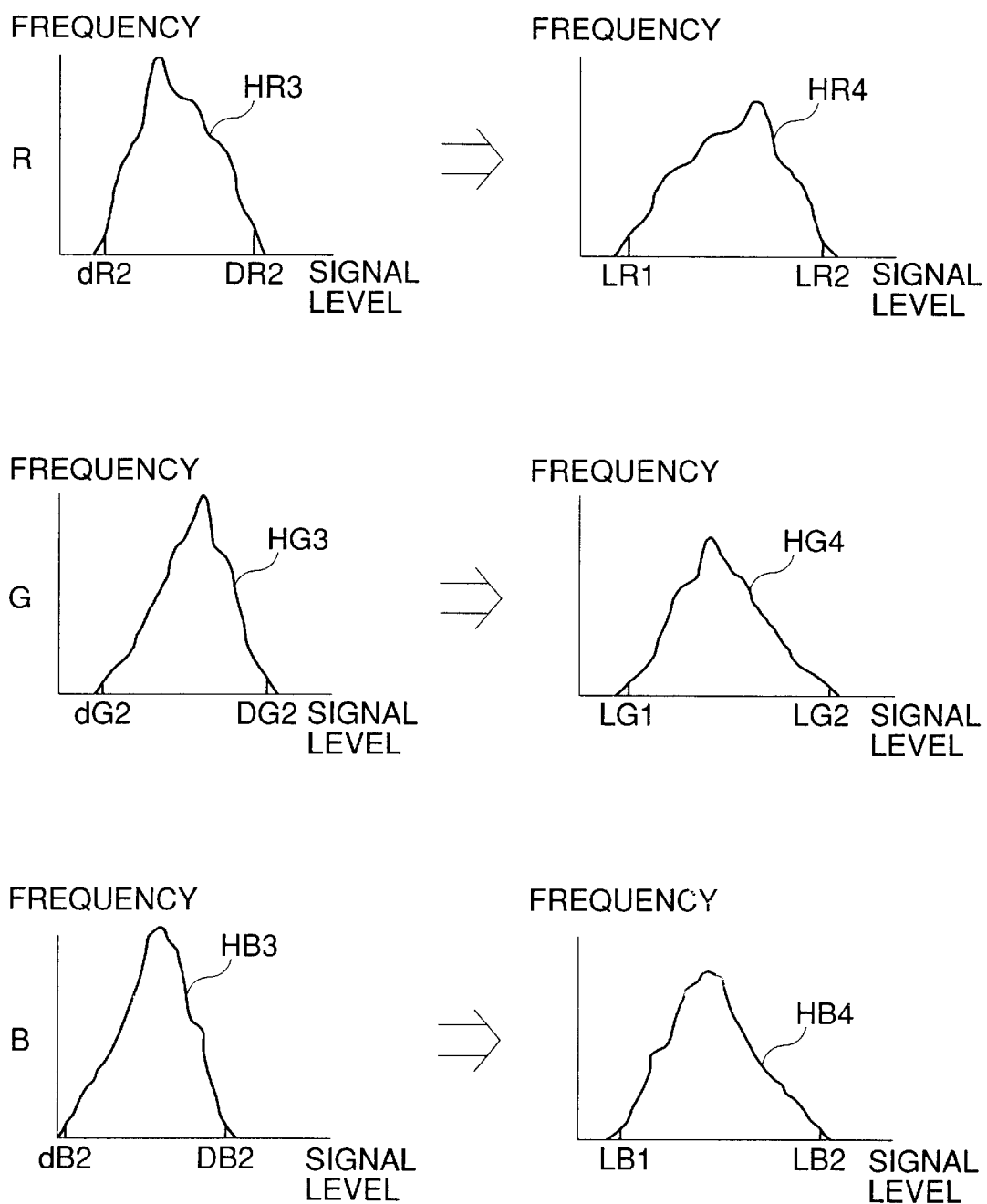
FIG. 6 shows histograms generated based on image data obtained in a coarse scanning operation executed in Step 106 of FIG. 3.

FIG. 3 is a flowchart of an image reading routine executed in the image reading device. FIG. 4 shows an example of a surface of the display device of the computer 60. FIGS. 5 and 6 show histograms generated based on image data obtained by the coarse scanning operations in Steps 102 and 106, respectively. With reference to these drawings, an operation of the image reading device is described below. Note that the operation of the image reading device is controlled by clicking a predetermined label indicated on the surface of the display device, using a mouse, for example.

In step 101, it is determined whether a pre-scanning operation is to be performed. A label "MP", denoting the pre-scanning operation and indicated on the surface of the display device, is clicked and the process goes from Step 101 to Step 102, so that a coarse scanning operation, i.e. an exposure measurement, is carried out. Namely, while the light source 20 is turned ON, the film M is intermittently moved, via the moving mechanism 10, with a coarser pitch than that of a regular scanning operation performed in Step 111. During the intermittent movement, the line sensor 30 is exposed for a predetermined exposure time T, so that image data of one frame image is detected. Note that, in the coarse scanning operation, the light source 20 is controlled in such a manner that the light-emitting diodes 21R, 21G and 21B are illuminated in a predetermined order every time the stage 12 is stopped, so that R, G and B image data are obtained.

In Step 103, a histogram representing a distribution of signal levels is generated for each of the R, G and B image data obtained in Step 102. Namely, as shown in FIG. 5, an R-histogram HR1, a G-histogram HG1 and a B-histogram HB1 are obtained. In Step 104, regarding each of the color components R, G and B, upper effective levels DR1, DG1, DB1 are obtained, each of which is a value that is less than the maximum value of the histogram by a predetermined amount. The upper effective level corresponds to a signal level which is obtained as follows: the frequencies of occurrence of the upper range of signal levels included in the histogram are summed from the highest signal level, and when the sum reaches 0.5%, for example, of the total sum of all of the frequencies of occurrence for the entire range of signal levels included in the histogram, the boundary signal level is the upper effective level.

In Step 105, based on the exposure time T from the execution of Step 102, the upper effective levels DR1, DG1 and DB1 obtained in Step 104, and a predetermined value PRD ("1023", for example, representing 10-bit data), an optimum exposure time is calculated for each of the color components. The optimum exposure time TR regarding the red component is:

$$TR=(PRD/DR1) \times T$$

The optimum exposure time TG regarding the green component is:

$$TG=(PRD/DG1) \times T$$

The optimum exposure time TB regarding the blue component is:

$$TB=(PRD/DB1) \times T$$

In the histograms HR1, HG1 and HB1, shown on the left side of FIG. 5, by multiplying each of the signal levels (abscissa of the histogram) by a coefficient (TR/T), (TG/T) and (TB/T), respectively, second histograms HR2, HG2 and HB2, shown on the right side of FIG. 5, are obtained. Namely, the second histograms HR2, HG2 and HB2 are estimations of histograms that would be obtained if an image were to be read using the optimum exposure time. However, in reality, histograms slightly different from the second histograms would be obtained. Namely, when a coarse scanning operation is again performed in Step 106, using the optimum exposure times TR, TG and TB, third histograms HR3, HG3 and HB3, shown on the left side of FIG. 6, are obtained.

In Step 107, regarding the third histogram HR3, an upper effective level DR2 and a lower effective level dR2 are obtained. The same procedure as that executed in Step 104 is utilized to obtain the upper effective level DR2. The lower effective level dR2 is a value which is greater than the minimum value of the histogram by a predetermined amount. Then, this histogram HR3 undergoes left-right inversion, in such a manner that the upper effective level DR2 coincides with a lower reference value LR1 of a look-up-table and the lower effective level dR2 coincides with an upper reference value LR2 of the look-up-table. Thus, a linear-reversal gradation correction is performed, and a fourth histogram HR4 is obtained. Note that the look-up-table is referred to when a gamma correction is performed to image data in the pre-scanning operation and the regular scanning operation, as described later.

In a similar way, regarding the histogram HG3, the upper effective level DG2 and the lower effective level dG2 are obtained. Then, the linear-reversal gradation correction is performed in such a manner that the upper effective level DG2 and the lower effective level dG2 coincide with a lower reference value LG1 and an upper reference value LG2 of the look-up-table, respectively, so that a fourth histogram HG4 is obtained. Further, in a similar way, regarding the histogram HB3, the upper effective level DB2 and the lower effective level dB2 are obtained. Then, the linear-reversal gradation correction is performed in such a manner that the upper effective level DB2 and the lower effective level dB2 coincide with a lower reference value LB1 and an upper reference value LB2 of the look-up-table, respectively, so that a fourth histogram HB4 is obtained.

Regarding the R-image, the image data corresponding to the third histogram HR3 is converted to the image data corresponding to the fourth histogram HR4, as follows:

R-normalization Data $$=LR2-(ID-dR2)\times(LR2-LR1)/(DR2-dR2) \quad (1)$$

wherein "ID" is input data, which is image data corresponding to the third histogram HR3, and the R-normalization data is image data corresponding to the fourth histogram BR4. "dR2" and "(LR2–LR1)/(DR2–dR2)" are color correction parameters for the R-image.

Similarly, regarding the G-image, the image data corresponding to the third histogram HG3 is converted to the image data corresponding to the fourth histogram HG4, as follows:

G-normalization Data $$=LG2-(ID-dG2)\times(LG2-LG1)/(DG2-dG2) \quad (2)$$

Regarding the B-image, the image data corresponding to the third histogram HB3 is converted to the image data corresponding to the fourth histogram HB4, as follows:

B-normalization Data $$=LB2-(ID-dB2)\times(LB2-LB1)/(DB2-dB2) \quad (3)$$

"dG2" and "(LG2–LG1)/(DG2–dG2)" are color correction parameters for the G-image, and "dB2" and "(LB2–LB1)/(DB2–dB2)" are color correction parameters for the B-image.

Thus, in Step 107, regarding the R-, G- and B-image data, the color correction parameters, by which the conversion equations (1), (2) and (3) for performing the linear-reversal gradation corrections are determined, are calculated.

In Step 108, a pre-scanning operation is performed in accordance with the optimum exposure time obtained in Step 105. In the pre-scanning operation, the film M is set at an initial position in which an end portion of the film M faces the light source 20, and then the image recorded in the film M is read with a pitch, which is coarser than that of a regular scanning operation performed in Step 111. In this reading operation, the light-emitting diodes 21R, 21G and 21B are illuminated in a predetermined order every time the stage 12 is stopped, so that R, G and B image data are detected line by line. Then, the image data are subjected to a correction process using the color correction parameters in accordance with the equations (1), (2) and (3). Then, the look-up-table is referred to, so that a gamma correction is carried out on the image data. After the correction is performed, the image data are transmitted to the computer 60. Thus, the obtained image PI (FIG. 4) is indicated on a part of the surface of the display device, together with various labels and information.

In Step 109, it is determined whether the regular scanning operation is to be started. The user of the image reading device can determine whether the regular scanning operation is to be started, by observing the pre-scanned image PI indicated on the surface of the display device. When a label "MS" of the regular scanning operation, indicated on the surface of the display device of the computer 60, is clicked, the process goes from Step 109 to Step 111, in which the regular scanning operation is performed. The regular scanning operation is basically the same operation as that of the pre-scanning operation, except that the reading pitch of the line sensor 30 is relatively fine in comparison with the pre-scanning operation. Namely, the image data read by the regular scanning operation are subjected to the correction processes according to the equations (1), (2) and (3), and the gamma correction. Then, the corrected image is indicated on a surface of the display device. When the regular scanning operation ends, Step 109 is again executed.

Conversely, when the label "MS" of the regular scanning operation is not clicked, Step 110 is executed, in which it is determined whether the pre-scanning operation is again to be performed. When the label "P" of the pre-scanning operation is clicked, the process goes back to Step 107. Conversely, when the label "MP" is not clicked, the process returns to Step 109. Namely, while neither of the labels "MS" nor "MP" is clicked, Steps 109 and 110 are repeatedly executed.

Note that, if a label "ME", which is indicated on the surface of the display device to imply an ejecting operation, is clicked, the image reading routine ends due to an interruption operation, and the film M is ejected from the image reading device.

Figure 7:
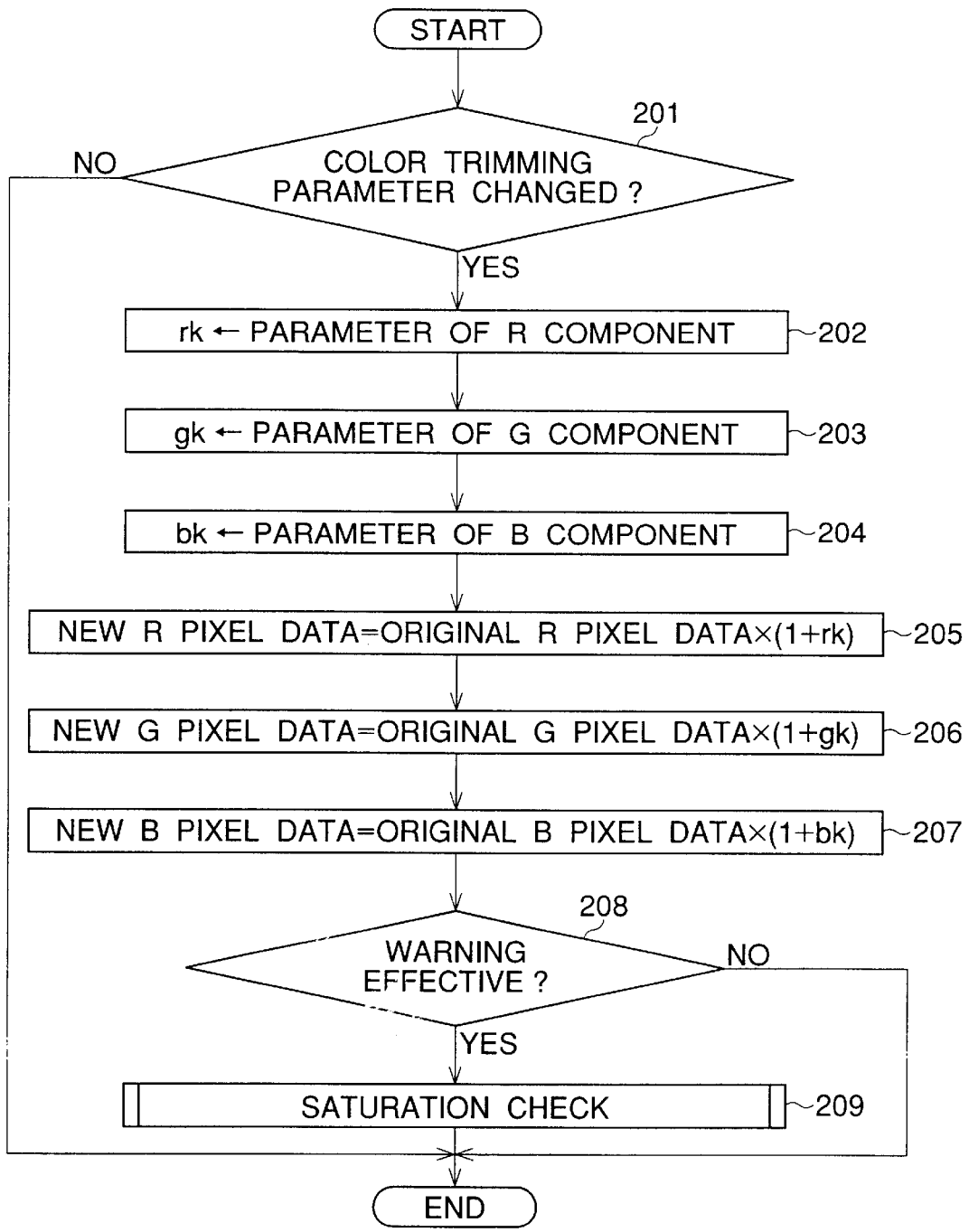
FIG. 7 is a flowchart of a gain adjustment routine, by which gains of red, green and blue components are adjusted.

FIG. 7 is a flowchart of a gain adjustment routine, by which gains of red, green and blue components are adjusted. The gain adjustment routine is executed so that the tint of the color image indicated on the surface of the display device is adjusted. The gain adjustment routine is executed by the computer 60, and interruptedly-executed, at every 100 msec, for example, while the pre-scanned image IP is indicated on the surface of the display device.

In Step 201, it is determined whether color trimming parameters have been changed. The color trimming parameters are changed by moving gain setting buttons BR, BG and BB on the surface of the display device shown in FIG. 4. The position of these buttons BR, BG and BB are changed by dragging the mouse rightward or leftward. For example, when the gain setting button BR for the red component is set to the right side from the center position, the gain of the red component increases, so that a reddish tone of the reproduced color image is increased. Conversely, when the gain setting button BR is set to the left side from the center position, the gain of the red component decreases. This also applies to the gains of the green and blue components when the respective buttons BG and BB are operated.

When it is determined in Step 201 that the color balance trimming parameters have not been changed, Steps 202 through 209 are skipped, and the gain adjustment routine ends. Conversely, when it is determined in Step 201 that the color balance trimming parameters have been changed, Step 202 and the following Steps are performed so that a gain adjustment is carried out.

In Step 202, a parameter, which has been inputted through the gain setting button BR for the red component, is set as a correction coefficient rK for the red component. In Step 203, a parameter, which has been inputted through the gain setting button BG for the green component, is set as a correction coefficient gK for the green component. In Step 204, a parameter, which has been inputted through the gain setting button BB for the blue component, is set as a correction coefficient bK for the blue component. These correction coefficients rK, gK and bK have values between −0.5 through 0.5, for example.

In Steps 205 through 207, the gain adjustments are carried out for all of the pixel data forming one image. In Step 205, the original pixel data of the red component are multiplied by (1+rK), so that gain-adjusted pixel data of red component are obtained. In Step 206, the original pixel data of the green component are multiplied by (1+gK), so that gain-adjusted pixel data of green component are obtained. In Step 207, the original pixel data of the blue component are multiplied by (1+bK), so that gain-adjusted pixel data of blue component are obtained. Each of the pixel data, which have been subjected to the gain adjustment, are stored in a memory for image indication, provided in the computer 60.

However, for example, when one of the moving amounts of the buttons BR, BG and BB is too large, leading to values of the pixel data of the color component exceeding an upper limit, the color component signal becomes saturated, so that the tint of the reproduced image unnaturally exaggerated. As described below, the embodiment is constructed in such a manner that it is determined whether pixel data exceed a limit leading to saturation.

In Step 208, it is determined whether a saturation warning, which is manually selected, is in effect. This is determined, based on whether an indication MN, representing "ON", or an indication MF, representing "OFF", which are indicated on a surface on the display device, and represent the status of a "SATURATION WARNING", is set to a black circle. Namely, when the indication MN is set to the black circle, by clicking a mouse, for example, the warning becomes effective, and when the indication MF is set to the black circle, the warning is not in effect.

Figure 8:
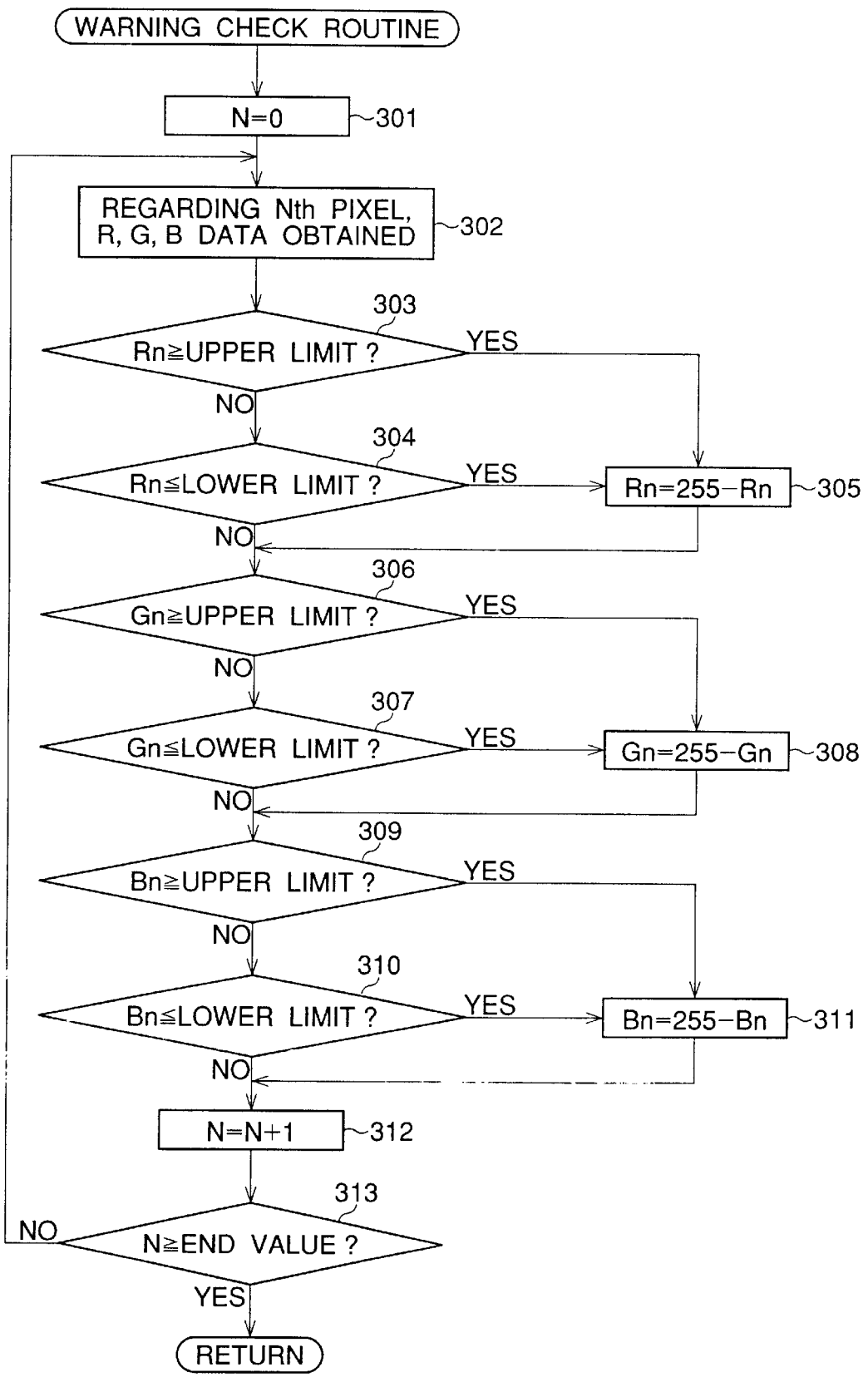
FIG. 8 is a flowchart of a saturation check routine.

When the warning is inoperative, this routine ends without executing Step 209, and when the warning is in effect, Step 209 is executed. In Step 209, a saturation check routine shown in FIG. 8 is executed, so that, in the image PI indicated on the surface of the display device, pixel data which exceed predetermined saturation parameters are replaced by other pixel data, and indicated.

The saturation check routine is described below with reference to FIG. 8. In Step 301, a parameter N indicating a pixel of one image is set to 0. In Step 302, regarding an Nth pixel, each of the Nth pixel data of the red, green and blue components is read from the memory. The Nth pixel data of the red, green and blue components are referred to as "Rn", "Gn" and "Bn", hereinafter. In this description, each of the pixel data is represented by 8 bits, and it is supposed that an upper limit value of the saturation range is 255, and a lower limit value of the saturation range is 0. Note that the upper limit value may be less than 255, and the lower limit value may be greater than 0.

In Step 303, it is determined whether the value of Rn is greater than or equal to the upper limit value of the saturation range. When the value of Rn is less than the upper limit value, Step 304 is executed, in which it is determined whether the value of Rn is less than or equal to the lower limit value of the saturation range. When the value of Rn is greater than or equal to the upper limit value, or is less than or equal to the lower limit value, Step 305 is executed, in which the pixel data is reversed according to the following formula:

$$Rn=255-Rn$$

In a similar way, in Step 306, it is determined whether the value of Gn is greater than or equal to the upper limit value of the saturation range, and in Step 307, it is determined whether the value of Gn is less than or equal to the lower limit value of the saturation range. When the value of Gn is greater than or equal to the upper limit value, or is less than or equal to the lower limit value, Step 308 is executed, in which the pixel data is reversed according to the following formula:

$$Gn=255-Gn$$

In Step 309, it is determined whether the value of Bn is greater than or equal to the upper limit value of the saturation range, and in Step 310, it is determined whether the value of Bn is less than or equal to the lower limit value of the saturation range. When the value of En is greater than or equal to the upper limit value, or is less than or equal to the lower limit value, Step 311 is executed, in which the pixel data is reversed according to the following formula:

$$Bn=255-Bn$$

In Step 312, 1 is added to the parameter N. In Step 313, it is determined whether the value of the parameter N is the end value, i.e. the number of all of the pixels of one image. When the parameter N has not reached the end value, the process goes back to Step 302. Conversely, when the parameter N has reached the end value, since the saturation range check has been completed for all of the pixels, this routine ends.

Based on the pixel data, which are obtained by the process described above, a color image is indicated on the surface of the display device. Namely, in parts PS (FIG. 4) of the displayed image PI, the corresponding pixel data, which have values in excess of the saturation range, are reversed. Therefore, the user can easily recognize an area of the image, in which a color component has become saturated.

Further, in the embodiment, when at least a part of the pixel data of the red, green and blue components deviates outside the saturation range, not only the color of the part PS, in which the saturated color component lies, is altered, but also the warning, which implies that the gain changed through the button BR, BG or BB is improper, is outputted. This warning is outputted as a comment "!SATURATED PIXEL OCCURS (G)", for example, below the color image PI on the surface of the display device and designated by the legend PC in FIG. 4. The warning may also be outputted as a sound or voice. Note that "(G)" implies that the pixel data of the green component exceed the saturation range.

The upper limit value UV of the saturation range for outputting the warning is indicated on the surface of the display device, and can be changed using the mouse or the keyboard, for example. Similarly, the lower limit value LV of the saturation range for outputting the warning is indicated on the surface of the display device, and can be changed using the mouse or the keyboard, for example. Thus, the saturation range is adjustable, and the upper limit value DV and the lower limit value LV can be set independently from each other. These limit values UV and LV are inputted into the system control circuit 40, so as to be used as the upper limit value and the lower limit value of the saturation range in the saturation check routine shown in FIG. 8.

As described above, in the embodiment, the calculations of the gain adjustments for the red, green and blue components are carried out in the computer 60, and the image obtained by the calculation and whether the saturation of pixel data has occurred, are indicated on the surface of the display device connected to the computer 60. Therefore, before scanning the film M in accordance with the adjusted gains, it can be determined whether saturation will occur in the image to be reproduced.

Further, in the embodiment, since the color of a part in which the saturation occurs in the gain-adjusted image, which is indicated on the surface of the display device, is changed to a different color from the original color, the generation of the saturation and the area of occurrence are easily recognizable.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-176475 (filed on Jun. 17, 1997) which is expressly incorporated herein, by reference, in its entirety.

What is claimed is:

1. A color balance adjusting device, by which a color balance of a color image, which includes pixel data comprising at least a first color component and a second color component, is adjusted, said device comprising:
   a gain changing processor that changes a gain of each of said first and second color components;
   a pixel data calculating processor that calculates pixel data of said first and second color components, using said gains changed by said gain changing processor; and
   a warning processor that outputs a warning implying that said gain, which is changed by said gain changing processor, is improper, when at least a part of said pixel data of said first and second color components, which is obtained by said pixel data calculating processor, exceeds a saturation range, said warning processor outputting the warning by reversing the pixel data which exceeds the saturation range in accordance with a predetermined relationship.

2. A device according to claim 1, wherein each of said first and second color components is one of a red component, a green component and a blue component.

3. A device according to claim 1, wherein said saturation range is adjustable.

4. A device according to claim 3, wherein said saturation range comprises an upper limit value and a lower limit value, which can be set independently from each other.

5. A device according to claim 1, wherein said color image is indicated on a surface of a display device, and said warning is indicated on said surface as a part of said color image.

6. A device according to claim 5, wherein said part of said color image is indicated in a different color from the original color.

7. A device according to claim 1, wherein said warning is outputted as a sound.

8. A device according to claim 1, wherein said warning is outputted as a comment on a surface of a display device.

9. A device according to claim 1, wherein said warning processor changes pixel data, which deviates from said saturation range, to other pixel data, said other pixel data being indicated as part of said color image on a surface of a display device.

10. A device according to claim 1, further comprising a warning changing processor that selects whether said warning processor is to be operated.

11. The color balance adjusting device according to claim 1, further comprising a mechanism configured to deactivate the warning processor.

12. The color balance adjusting device according to claim 1, said predetermined relationship comprising subtracting said at least a part of said pixel data from a predetermined value.

13. A color balance adjusting device, by which a color balance of a color image, which includes pixel data composed of a plurality of color components, is adjusted, said device comprising:
   a gain changing processor that changes gains of said color components; and
   a warning processor that, when pixel data, which exceeds a saturation range, exists in pixel data of said plurality of color components calculated by using said gains changed by said gain changing processor, outputs a warning implying that a part of said pixel data exceed said saturation range, said warning processor outputting the warning by reversing the pixel data which exceeds the saturation range in accordance with a predetermined relationship.

14. The color balance adjusting device according to claim 13, further comprising a mechanism configured to deactivate the warning processor.

15. The color balance adjusting device according to claim 11, said predetermined relationship comprising subtracting said at least a part of said pixel data from a predetermined value.

16. A color balance adjusting device, by which a color balance of a color image, which includes pixel data comprising at least a first color component and a second color component is adjusted, said adjusting device comprising:
   a gain changing processor that changes a gain of each of said first and second color components;
   a pixel data calculating processor that calculates pixel data of said first and second color components, using said gains changed by said gain changing processor; and
   a warning processor that outputs a warning indicating that said gain, which is changed by said gain changing processor, is improper, when at least a part of said pixel data of said first and second components, which is obtained by said pixel data calculating processor exceeds a saturation range, the warning comprising an indication in the color image and a comment related to the color image, said warning processor reversing pixel data in accordance with a predetermined relationship when at least a part of said pixel data of said first and second color components, which is obtained by said pixel data calculating processor, exceeds the saturation range.

17. The color balance adjusting device according to claim 16, said comment being provided adjacent a color image display area.

18. The color balance adjusting device according to claim 16, further comprising a mechanism configured to deactivate the warning processor.

19. The color balance adjusting device according to claim 16, said warning processor changing pixel data, which deviates from said saturation range, to other pixel data, said other pixel data being indicated as part of the color image on a surface of a display device.

* * * * *